United States Patent
Asano et al.

(10) Patent No.: US 8,746,033 B2
(45) Date of Patent: Jun. 10, 2014

(54) ANGULAR VELOCITY SENSOR

(75) Inventors: Satoshi Asano, Hitachi (JP); Masahiro Matsumoto, Hitachi (JP); Yasushi Okada, Susono (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 385 days.

(21) Appl. No.: 13/126,615

(22) PCT Filed: Oct. 21, 2009

(86) PCT No.: PCT/JP2009/068121
§ 371 (c)(1),
(2), (4) Date: Jun. 16, 2011

(87) PCT Pub. No.: WO2010/050393
PCT Pub. Date: May 6, 2010

(65) Prior Publication Data
US 2011/0252886 A1   Oct. 20, 2011

(30) Foreign Application Priority Data

Oct. 30, 2008  (JP) ................. 2008-279033

(51) Int. Cl.
*G01C 19/56*   (2012.01)
(52) U.S. Cl.
USPC .................................. 73/1.37; 73/504.12
(58) Field of Classification Search
USPC ................... 73/1.37, 504.12, 504.14, 504.15, 73/504.16
See application file for complete search history.

(56) References Cited

U.S. PATENT DOCUMENTS

| | | | |
|---|---|---|---|
| 5,969,225 A | 10/1999 | Kobayashi |
| 6,267,008 B1 | 7/2001 | Nagao |
| 2006/0150745 A1 | 7/2006 | Lang |

FOREIGN PATENT DOCUMENTS

| | | |
|---|---|---|
| EP | 0 833 127 A1 | 4/1998 |
| EP | 0 995 968 A2 | 4/2000 |
| JP | 4-102013 A | 4/1992 |
| JP | 10-103960 A | 4/1998 |
| JP | 11-132770 A | 5/1999 |
| JP | 2000-171257 A | 6/2000 |
| JP | 2000-193460 A | 7/2000 |

OTHER PUBLICATIONS

International Search Report including English language translation dated Jan. 26, 2010 (Six (6) pages).
Extended European Search Report dated Dec. 2, 2013 (nine (9) pages).

*Primary Examiner* — John Chapman, Jr.
(74) *Attorney, Agent, or Firm* — Crowell & Moring LLP

(57) ABSTRACT

Failures can be detected with high accuracy even the ambient temperature changes or background vibration is applied. An angular velocity sensor is composed of a vibrator which is elastically and displaceably supported on a substrate; a driving means which vibrates the vibrator in the drive axis direction horizontal to the substrate surface; a displacement detecting means in the detection axis direction, which detects a displacement of the vibrator in the detection axis direction horizontal to the substrate surface and perpendicular to the drive axis direction; an angular velocity detecting means which detects an angular velocity based on the displacement of the vibrator in the detection axis direction; a self-vibration detecting means that detects self-vibration of the vibrator, which is generated due to leakage in the detection axis direction of the vibration of the vibrator in the drive axis direction; a self-vibration feedback circuit which completely cancels the self-vibration of the vibrator; and an abnormality determining means which determines abnormality using an output from the self-vibration detecting means.

3 Claims, 10 Drawing Sheets

ANGULAR VELOCITY SENSOR

TECHNICAL FIELD

The present invention relates to a vibration type angular velocity sensor, and more particularly to a vibration type angular velocity sensor provided with a constant self-diagnosis function to perform a constant diagnosis of abnormality of the angular velocity sensor.

BACKGROUND ART

The vibration type angular velocity sensor utilizes the generation of vibration (hereinafter called as the Coriolis vibration) by causing the vibrator within the angular velocity sensor to make resonant drive (hereinafter called as the drive vibration) and applying an angular velocity in a rotation axis direction perpendicular to the drive axis direction of the vibrator, to apply a Coriolis force in a detection axis direction perpendicular to the rotation axis direction and the drive axis direction, and the applied angular velocity is obtained by signal processing the amplitude of the generated Coriolis vibration.

Therefore, the vibrator is provided with a driving electrode for drive vibration of the vibrator and a detection electrode for detection of the Coriolis vibration. For the detection electrode, there is a detecting type such as an electrostatic capacitance type that detects an amplitude according to an electrostatic capacitance change or a piezoelectric type that detects an amplitude by using the piezoelectric effect.

But, it is known that a micro vibration is generated in a detection axis direction even when the angular velocity is not applied actually. It is a vibration (hereinafter called as the self-vibration) in the detection axis direction generated as a result that the drive vibration applied in the drive axis direction of the vibrator has leaked in the detection axis direction due to a minute error or the like of a sensor element structure including the vibrator and its support portion, and this self-vibration generates in the same phase as the drive vibration. And, the self-vibration has a steady amplitude unless structural abnormality is not generated in the sensor element and a signal processing circuit configuring the angular velocity sensor.

Patent Literature 1 (JP-A 2000-171257) describes a vibration type angular velocity sensor which performs failure diagnosis using the self-vibration, and it is an example to perform self-diagnosis by monitoring the amplitude of the self-vibration by the angular velocity sensor which detects an angular velocity by extracting an amplitude of the Coriolis vibration from an electric signal outputted from the vibrator and including the Coriolis vibration and the self-vibration according to the angular velocity.

CITATION LIST

Patent Literature

Patent Literature 1: JP-A 2000-171257

SUMMARY OF INVENTION

Technical Problem

The ambient temperature of the angular velocity sensor is largely variable depending on a place where the angular velocity sensor is disposed, a vehicle situation, a season and the like. And, background vibrations such as road vibrations caused when a vehicle runs and mechanical vibrations caused by a vehicle such as engine noise etc. are transmitted to the angular velocity sensor through the vehicle body. In a case that the angular velocity sensor is mounted on a vehicle, it is required to have high failure detecting reliability to detect a failure with excellent accuracy and high angular velocity detecting reliability to detect the angular velocity with excellent accuracy even in the above circumstance.

Especially, in view of the high reliability of the failure detection, the angular velocity sensor described in Patent Literature 1 has a resonance frequency of the vibrator changed at a portion in an engine room or the like where the temperature becomes high, and the vibration amplitude in the detection axis direction including the Coriolis vibration and the self-vibration changes, so that it is consequently necessary to set an allowable variation amount of the self-vibration to a large level. And, the background vibration from the road surface and the vehicle also influences on the vibration amplitude of the vibrator, the external force applied to the vibrator is outputted through the vibrator having a resonance characteristic, possibly causing a large detection error, and there is a possibility that a failure cannot be detected with good accuracy. The above conventional reference lacks consideration on the above situations.

The object of the present invention is to provide an angular velocity sensor capable of detecting a failure with excellent accuracy even if the ambient temperature changes or the background vibrations are applied.

Solution to Problem

The above-described object can be achieved by an angular velocity sensor having a vibrator which is elastically and displaceably supported on a substrate; a driving means which vibrates the vibrator in the drive axis direction horizontal to the substrate surface; a displacement detecting means in the detection axis direction, which detects a displacement of the vibrator in the detection axis direction which is horizontal to the substrate surface and perpendicular to the drive axis direction; an angular velocity detecting means which detects an angular velocity based on the displacement of the vibrator in the detection axis direction; a self-vibration detecting means that detects self-vibration of the vibrator, which is generated due to leakage in the detection axis direction of the vibration of the vibrator in the drive axis direction; a self-vibration feedback circuit which completely cancels the self-vibration of the vibrator; and an abnormality determining means which determines abnormality using an output from the self-vibration detecting means.

Advantageous Effects of Invention

An angular velocity sensor capable of detecting a failure with excellent accuracy even if the ambient temperature changes or the background vibrations are applied can be provided.

Other objects, characteristics and advantages of the present invention will be obvious from the description of the embodiments of the invention related to the attached drawings.

DESCRIPTION OF EMBODIMENTS

Embodiments of the invention are described below with reference to the drawings.

The angular velocity sensor of a first embodiment according to the invention is described with reference to FIG. 1.

Figure 1:
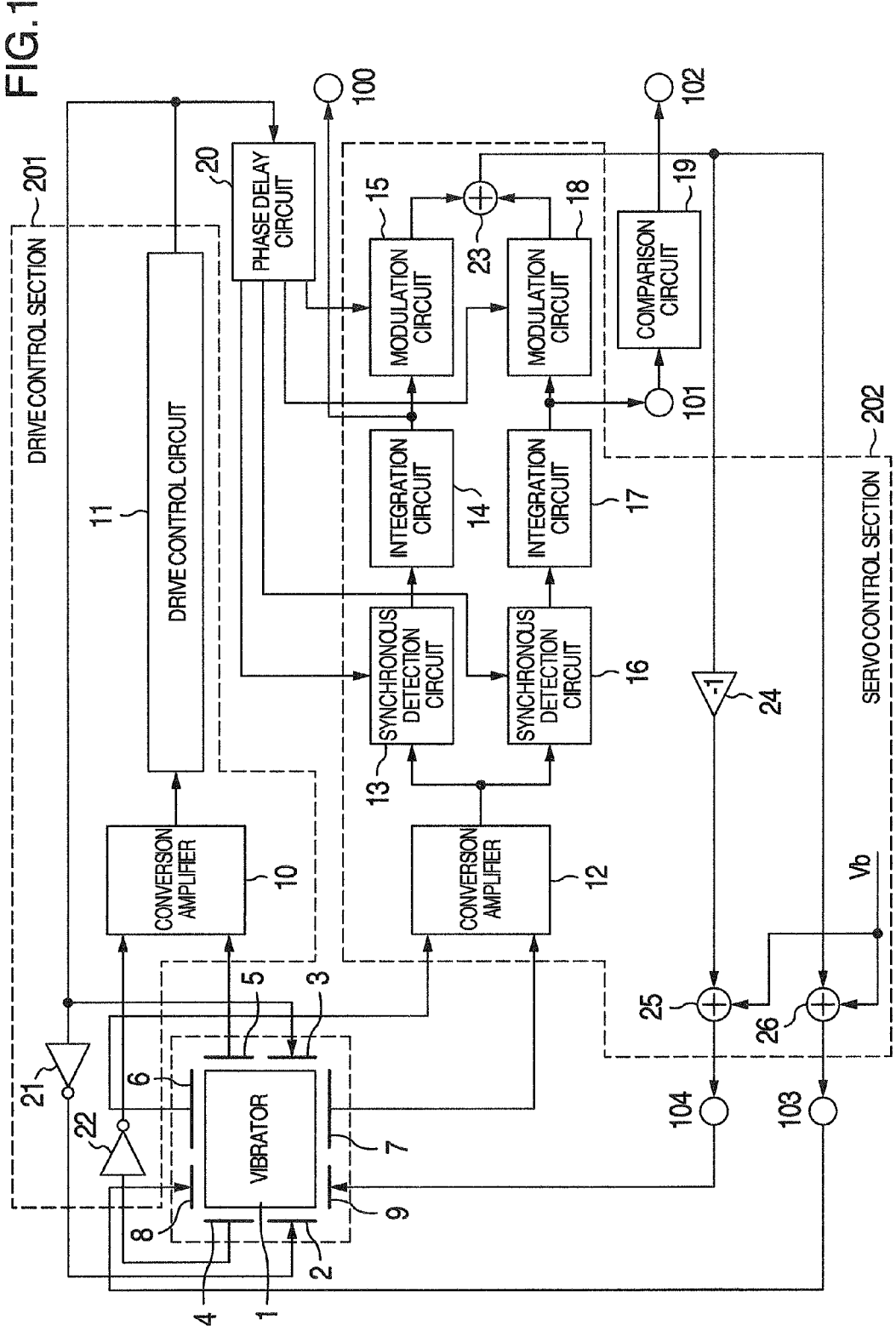
[FIG. 1] A structure of the angular velocity sensor according to a first embodiment.

FIG. 1 shows a structure according to the first embodiment of the angular velocity sensor provided by the invention.

In the angular velocity sensor of this embodiment, a sensor element 200 comprises a vibrator 1, driving electrodes 2 and 3 which apply an external force to perform drive vibration of the vibrator 1, drive detecting electrodes 4 and 5 which detect a displacement of the vibrator 1 in the drive axis direction, detection electrodes 6 and 7 which detect the displacement of the vibrator 1 in the detection axis direction, and servo electrodes 8 and 9 which apply an external force to cancel a Coriolis force acting on the vibrator 1.

A drive control section 201 comprises an inverter 22 which effects a phase inversion of the output of the drive detecting electrode 4, a conversion amplifier 10 which performs conversion and amplification of the outputs of the inverter 22 and the drive detection electrode 5 to a voltage signal according to a displacement amount of the vibrator 1 in the drive axis direction, a drive control circuit 11 which controls to keep constant the amplitude and cycle of the drive vibration of the vibrator 1 according to the output of the conversion amplifier 10, and an inverter 21 which performs a phase inversion of the output of the drive control circuit 11.

And, a servo control section 202 comprises a detection portion that is comprised of a conversion amplifier 12 which converts the outputs from the detection electrode 6 and 7 into a voltage signal according to a displacement amount of the vibrator in the detection axis direction, a synchronous detection circuit 13 which synchronously detects the output of the conversion amplifier 12 by a signal Φ1 having a phase delayed by 90 degrees from the output signal of the drive control circuit 11 of the vibrator 1, an integration circuit 14 which performs an integration operation on the output of the synchronous detection circuit 13, a synchronous detection circuit 16 which synchronously detects the output of the conversion amplifier 12 by a signal Φ3 having the same phase as the output signal of the drive control circuit 11 of the vibrator 1, and an integration circuit 17 which performs an integration operation on the output of the synchronous detection circuit 16; and a feedback portion that is comprised of a modulation circuit 15 which modulates by multiplying the output of the integration circuit 14 by a signal Φ2 having the same phase as the output signal of the drive control circuit 11 of the vibrator 1, a modulation circuit 18 which modulates by multiplying the output of the integration circuit 17 by a signal Φ4 having a phase delayed by 90 degrees from the output signal of the drive control circuit 11 of the vibrator 1, an adder 23 which adds the outputs of the modulation circuits 15 and 18, an inverter 24 which performs a phase inversion of the output of the adder 23, and adders 25 and 26 which add predetermined bias voltage Vb to the output of the adder 23 and the output of the inverter 24 to apply to the servo electrodes 8 and 9.

The angular velocity sensor is also comprised of a comparison circuit 19 which compares the output of the integration circuit 17 and a predetermined value, and a phase delay circuit 20 which adjusts the phases of the signals Φ1, Φ2, Φ3 and Φ4 used by the synchronous detection circuits 13 and 16 and the modulation circuits 15 and 18 with respect to the output signal of the drive control circuit 11.

The output of the integration circuit 14 is outputted to an output terminal 100, the output of the integration circuit 17 is outputted to an output terminal 101, the output of the comparison circuit 19 is outputted to an output terminal 102, the output of the adder 26 is outputted to an output terminal 103, and the output of the adder 25 is outputted to an output terminal 104.

The operation of the angular velocity sensor of this embodiment is described below.

In the angular velocity sensor of this embodiment, the drive control circuit 11 comprising a multiplier, an integration circuit, a limiter circuit and the like performs feedback control by performing drive vibration of the vibrator 1 in the drive axis direction by applying an external force from the driving electrodes 2 and 3, converting a minute voltage change, which is caused in the drive detection electrodes 4 and 5 due to the displacement of the vibrator 1 into the drive vibration, into a displacement signal according to the displacement amount of the vibrator 1 in the drive axis direction by the conversion amplifier 10 which is comprised of a preamplifier, a differential amplifier, and the like, and keeping constant a driving amplitude of the vibrator 1 according to the converted signal and also performing the drive vibration of the drive frequency at a resonance frequency of the vibrator 1, and the drive signal generated by the drive control circuit 11 is applied to the driving electrode 2 and 3 in mutually opposite phases to perform the drive vibration of the vibrator 1.

And, a minute voltage change caused in the detection electrodes 6 and 7 when the vibrator 1 is displaced by the Coriolis vibration is converted into a displacement signal according to the displacement amount of the vibrator 1 in the detection axis direction by the conversion amplifier 12 comprising a preamplifier, a differential amplifier and the like, and the servo control is performed by the servo control section 202 to apply the servo voltage to the servo electrodes 8 and 9 in mutually opposite phases to completely cancel the displacement of the vibrator 1 due to the Coriolis vibration and the self-vibration. This servo voltage is partly determined as an angular velocity detection signal and taken out to obtain the angular velocity.

In the servo control section 202, the detection portion synchronously detects the displacement signal of the vibrator 1, which is outputted from the conversion amplifier 12, by the Φ1 by the synchronous detection circuit 13 to detect a displacement (hereinafter called as the Coriolis component) of the vibrator 1 due to the Coriolis vibration. Then, the integration circuit 14 performs an integration operation on the signal obtained by the synchronous detection circuit 13. Similarly, the displacement signal of the vibrator 1 outputted from the conversion amplifier 12 is synchronously detected by the Φ3 by the synchronous detection circuit 16 to detect a displacement (hereinafter called as the self-vibration component) of the vibrator 1 due to the self-vibration. Then, the signal obtained by the synchronous detection circuit 16 is subject to an integration operation by the integration circuit 17.

To feed back the signal obtained by the integration circuits 14 and 17 to the vibrator 1, the feedback portion modulates the Coriolis component by the Φ2 by the modulation circuit 15 to generate a feedback signal (hereinafter called as the Coriolis feedback signal) according to the displacement due to the Coriolis vibration of the vibrator 1 in the detection axis direction. And, the self-vibration component is modulated by the Φ4 by the modulation circuit 18 to generate a feedback signal (hereinafter called as the self-vibration feedback signal) of the displacement due to the self-vibration of the vibrator 1 in the detection axis direction. The above two feedback signals are synthesized by the adder 23, and the synthesized feedback signal and the feedback signal which is undergone the phase inversion by the inverter 24 are added with bias voltage Vb by the adders 25 and 26 and applied to the servo electrodes 8 and 9 of the vibrator 1.

The servo control section 202 performs servo control to cancel the displacement of the vibrator 1 in the detection axis direction by the operations of the detection portion and the feedback portion described above.

In the state that the servo control is being performed, the output of the integration circuit 14 is outputted to the output terminal 100 to obtain an output voltage according to the Coriolis component, and the output of the integration circuit 17 is outputted to the output terminal 101 to obtain an output voltage according to the self-vibration component.

The output voltage to be outputted to the output terminal 101 is in accordance with the self-vibration component, and if the angular velocity sensor has disconnection or short-circuit or the vibrator has abnormality such as breakage, cohesion or the like, the self-vibration component is changed, so that it is possible to detect a failure of the angular velocity sensor by monitoring the self-vibration component. Specifically, the comparison circuit 19 is previously determined to have a boundary value of the self-vibration component, the self-vibration component according to the output voltage to be outputted to the output terminal 101 is compared with the boundary value, and if it deviates from the boundary value, it is determined as a failure, and a failure detection signal is outputted to the output terminal 102.

In the actual operation of the angular velocity sensor, the phase delay of the signal occurs among various types of filter circuits included in the signal processing circuit, so that the phases of the Coriolis vibration and the self-vibration of the vibrator 1 and the phases of the Coriolis component and the self-vibration component included in the output of the conversion amplifier 12 do not agree with one another. Similarly, the phases of the Coriolis vibration and the self-vibration of the vibrator 1 and the phases of the Coriolis feedback signal and the self-vibration feedback signal do not agree with one another. Therefore, even if the output signal of the drive control circuit 11 is synchronously detected by the Φ1 with the phase delayed by 90 degrees, a correct Coriolis component is not outputted at the output of the synchronous detection circuit 13. Similarly, correct output values are not outputted at the outputs of the synchronous detection circuit 16 and the modulation circuits 15 and 18 when detected by the individual Φ2, Φ3 and Φ4.

Therefore, the phase delay circuit 20 is disposed, and the treatment of separately delaying the phases of the individual detection signals Φ1, Φ2, Φ3 and Φ4 to the phase of the drive signal is performed. Specifically, the phase of the Φ1 to the drive signal is delayed so that the phase of the Φ1 agrees with the phase of the Coriolis vibration contained in the output from the conversion amplifier 12, the phase of the Φ2 to the drive vibration is delayed so that the phase of the Φ2 agrees with the Coriolis vibration of the vibrator 1, the phase of the Φ3 to the drive signal is delayed so that the phase of the Φ3 agrees with the phase of the self-vibration contained in the output from the conversion amplifier 12, and the phase of the Φ4 to the drive vibration is delayed so that the phase of the Φ4 agrees with the self-vibration of the vibrator 1. The above phase delay circuit can be realized by, for example, a CR filter for analog processing, and it can be realized by outputting one arbitrarily selected from, for example, a shift register having 16-stage configuration for digital processing.

Advantages obtained by this embodiment are described below.

A first advantage is that the displacement of the vibrator in the detection axis direction becomes zero because the servo control section 202 performs the servo control to cancel the displacement of the vibrator 1 in the detection axis direction by the operation of the feedback portion, so that the detection of the Coriolis component and the self-vibration component with high accuracy can be realized without being influenced by a change in resonance characteristics of the vibrator 1 due to a temperature change or the like.

The drive vibration is controlled by the drive control circuit 11 to have a constant drive frequency, so that when the resonance frequency of the vibrator 1 is changed because of a change in the ambient temperature of the angular velocity sensor in the conventional example described in Patent Literature 1, the displacement amount of the vibrator 1 in the detection axis direction is changed, and the Coriolis component and the self-vibration component cannot be detected with high accuracy.

A second advantage is that the influence at the time of input of disturbances into the vibrator 1 is suppressed because the servo control section 202 performs the servo control to cancel the displacement of the vibrator 1 in the detection axis direction by the operation of the feedback portion, so that the detection of the Coriolis component and the self-vibration component with high accuracy can be realized.

According to the conventional example described in Patent Literature 1, when disturbances such as machine vibration and the like generated by road surface irregularities and the vehicle body are inputted into the angular velocity sensor, the vibration amplitude of the vibrator 1 in the detection axis direction is influenced, and the inputted external force is outputted as a detection error, so that the Coriolis component and the self-vibration component cannot be detected with high accuracy.

A third advantage is that the Coriolis component and the self-vibration component are separated and extracted from the displacement signal of the vibrator 1 outputted by the conversion amplifier 12 in the detection portion by using the synchronous detection circuits 13 and 16, so that the detection of the Coriolis component and the self-vibration component with high accuracy can be realized.

A fourth advantage is that the servo control to cancel the displacement of the vibrator 1 in the detection axis direction with high accuracy is realized and the detection of the Coriolis component and the self-vibration component with high accuracy is realized by generating a feedback signal synchronized with the Coriolis vibration and the self-vibration of the vibrator 1 by the modulation circuits 15 and 18 with respect to the Coriolis component and the self-vibration component of the vibrator 1 outputted by the integration circuits 14 and 17 in an engine section.

A fifth advantage is that the phase delay circuit 20 is disposed, and the phases of the individual detection signals Φ1, Φ2, Φ3 and Φ4 with respect to the phase of the drive signal are separately undergone the delay treatment, so that the detection of the Coriolis component and the self-vibration component with high accuracy can be realized.

According to the conventional example described in Patent Literature 1, the phase delay of the signal is generated by various types of filter circuits included in the signal processing circuit, and since the phase of the Coriolis vibration and the self-vibration of the vibrator 1 and the phase of the Coriolis component and the self-vibration component contained in the output of the conversion amplifier 12 do not agree with each other, accurate Coriolis component and self-vibration component are not outputted to the outputs of the synchronous detection circuits 13 and 16.

As a modified example of the angular velocity sensor of the first embodiment of the invention, it may be configured by removing the comparison circuit 19 and disposing a synchronous detection circuit which synchronously detects a feedback signal by the Φ1, an integration circuit which performs an integration operation on the output of the synchronous detection circuit, a comparison circuit which compares the output of the integration circuit and a predetermined value. As a modified example of the phase delay circuit 20, it is also possible to dispose a phase delay circuit for each of the Φ1, Φ2, Φ3 and Φ4. And, the electrode configuring the sensor element 200 can respond to both an electrostatic capacitance type and a piezoelectric type. It is also possible to configure the angular velocity sensor by using a digital signal processing device having functions equivalent to the drive control section 201, the servo control section 202, the comparison circuit 19 and the phase delay circuit 20.

The angular velocity sensor of a second embodiment according to the invention is described below with reference to FIG. 2.

Figure 2:
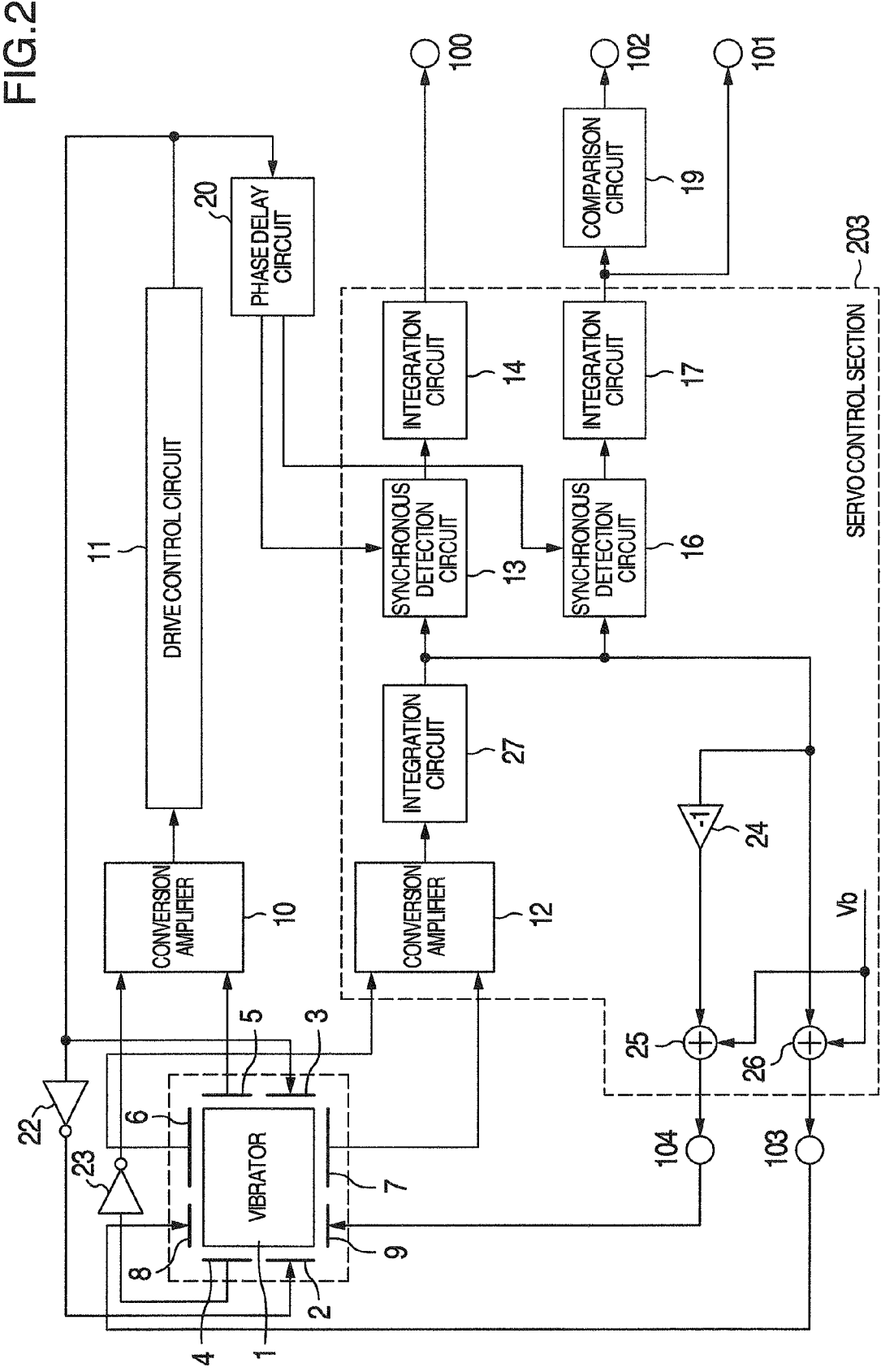
[FIG. 2] A structure of the angular velocity sensor according to a second embodiment.

FIG. 2 shows a structure according to the second embodiment of the angular velocity sensor provided by the invention.

This embodiment has a structure that a servo control section 203 is provided instead of the servo control section 202 of the first embodiment shown in FIG. 1, the servo control section 203 has a structure that the modulation circuits 15 and 18 and the adder 23 are removed from the servo control section 202 and an integration circuit 26 is provided, and the servo control section 203 comprises a detection portion that is comprised of an integration circuit 27 which performs an integration operation on the output of the conversion amplifier 12, the synchronous detection circuit 13 which synchronously detects the output of the integration circuit 27 by the Φ1, an integration circuit 14 which performs an integration operation on the output of the synchronous detection circuit 13, the synchronous detection circuit 16 which synchronously detects the output of the integration circuit 27 by the Φ3, and the integration circuit 17 which performs an integration operation on the output of the synchronous detection circuit 16; and a feedback portion that is comprised of an inverter 24 which performs a phase inversion of the output of the integration circuit 27, and adders 25 and 26 which add predetermined bias voltage Vb to the output of the integration circuit 27 and the output of the inverter 24 and applies to the servo electrodes 8 and 9. In this embodiment, it is appropriate by reducing the number of the synchronous detection circuits to two in comparison with the embodiment 1 and adjusting the two detection signals Φ1 and Φ3 at the output of the phase delay circuit 20.

The operation of the servo control section 203 in this embodiment is described below.

In the servo control section 203 of this embodiment, the feedback portion generates a feedback signal to be fed back to the vibrator 1 by performing an integration operation on the displacement signal of the vibrator 1, which is outputted by the conversion amplifier 12, by the integration circuit 27, and bias voltage Vb is added to the feedback signal and the feedback signal undergone the phase inversion by the inverter 24, by the adders 25 and 26, and applied to the servo electrodes 8 and 9 of the vibrator 1.

Then, the detection portion detects a Coriolis component by synchronously detecting, the feedback signal which is outputted by the integration circuit 27, by the Φ1 by the synchronous detection circuit 13. The integration circuit 14 then performs an integration operation on the signal obtained by the synchronous detection circuit 13. Similarly, the feedback signal outputted by the conversion amplifier 27 is synchronously detected by the Φ3 by the synchronous detection circuit 16 to detect a self-vibration component. Then, the integration circuit 17 performs an integration operation on the signal obtained by the synchronous detection circuit 16.

The servo control section 203 performs servo control to cancel the displacement of the vibrator 1 in the detection axis direction by the operations of the detection portion and the feedback portion described above.

In the state that the servo control is being performed, the output of the integration circuit 14 is outputted to the output terminal 100 to obtain an output voltage according to the Coriolis component, and the output of the integration circuit 17 is outputted to the output terminal 101 to obtain an output voltage according to the self-vibration component.

This embodiment also has the same advantages as the first, second, third and fifth advantages of the first embodiment, but the feedback signal is generated without separating the Coriolis component and the self-vibration component by the feedback portion of the servo control section 203, so that the circuit structure of the feedback portion can be further simplified.

The angular velocity sensor of a third embodiment of the invention is described below with reference to FIG. 3.

Figure 3:
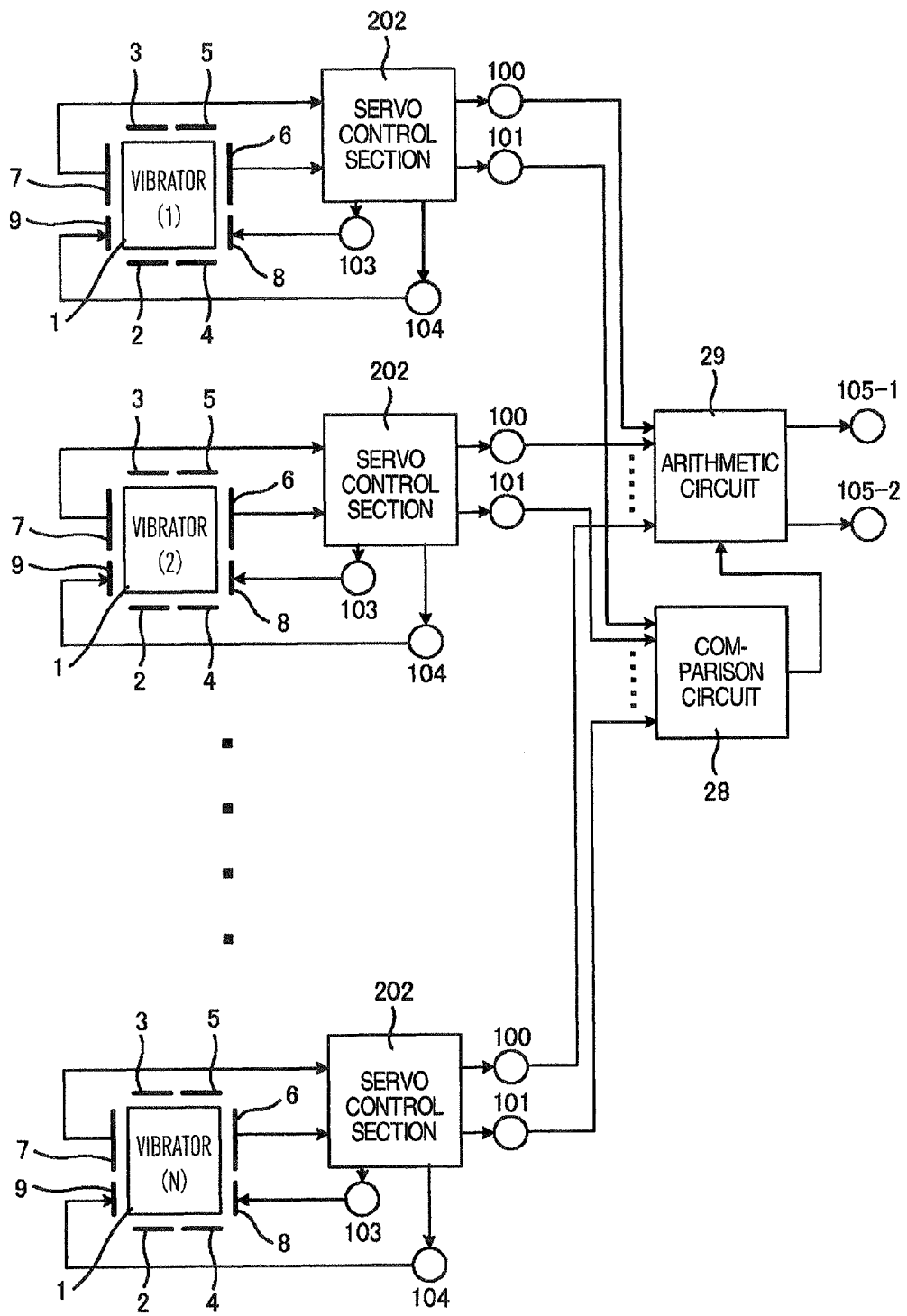
[FIG. 3] A structure of the angular velocity sensor according to a third embodiment.

FIG. 3 shows a structure according to the third embodiment of the angular velocity sensor provided by the invention.

This embodiment is configured by arranging the angular velocity sensor described in the first embodiment shown in FIG. 1 in plural and in parallel (hereinafter called as the angular velocity sensors 1, 2, . . . N) with the comparison circuit 19 removed from the individual angular velocity sensors 1 to N, and disposing a comparison circuit 28 and an arithmetic circuit 29.

In the angular velocity sensor of this embodiment, the output voltages according to the Coriolis components outputted to the output terminals 100 of the individual angular velocity sensors 1 to N are inputted to the arithmetic circuit 29, and the output voltages corresponding to the self-vibration components outputted to the output terminals 101 of the individual angular velocity sensors 1 to N are inputted to the comparison circuit 28. Then, the output voltages according to the self-vibration components of the individual angular velocity sensors 1 to N inputted to the comparison circuit 28 and the boundary value previously set in the comparison circuit 28 are compared by the comparison circuit 28 to determine a failure of the individual angular velocity sensors 1 to N, and the failure determination signal is outputted to the arithmetic circuit 29. Then, the averaging calculation is performed by the arithmetic circuit 29 on the output voltages according to the Coriolis components of the angular velocity sensors 1 to N not regarded as a failure based on the failure determination signals outputted by the comparison circuit 28 and outputted to an output terminal 105-1. And, the number of the angular velocity sensors regarded as a failure according to the outputs of the comparison circuit 28 is recognized, and if the number of the angular velocity sensors recognized as the failure exceeds a predetermined number, a warning signal is outputted to an output terminal 105-2.

This embodiment also has the same advantages as the first embodiment, but more stable angular velocity information can be obtained by performing the averaging calculation by the arithmetic circuit 29 on the output voltages according to the Coriolis components of the angular velocity sensors 1 to N not determined as a failure based on the failure determination signal outputted from the comparison circuit 28. The angular velocity sensors of this embodiment are configured by having the angular velocity sensor of the first embodiment in plural, so that even if abnormality is generated in any one of the angular velocity sensors, it is possible to continuously obtain normal angular velocity information by the other angular velocity sensors. And, the number of the angular velocity sensors regarded as a failure based on the output of the comparison circuit 28 is recognized by the arithmetic circuit 29, and if the number of the angular velocity sensors recognized as the failure exceeds a predetermined number, a warning signal is outputted, so that it is possible to monitor the operation conditions of the angular velocity sensors of this embodiment.

The angular velocity sensor of a fourth embodiment of the invention is described below with reference to FIG. 4.

Figure 4:
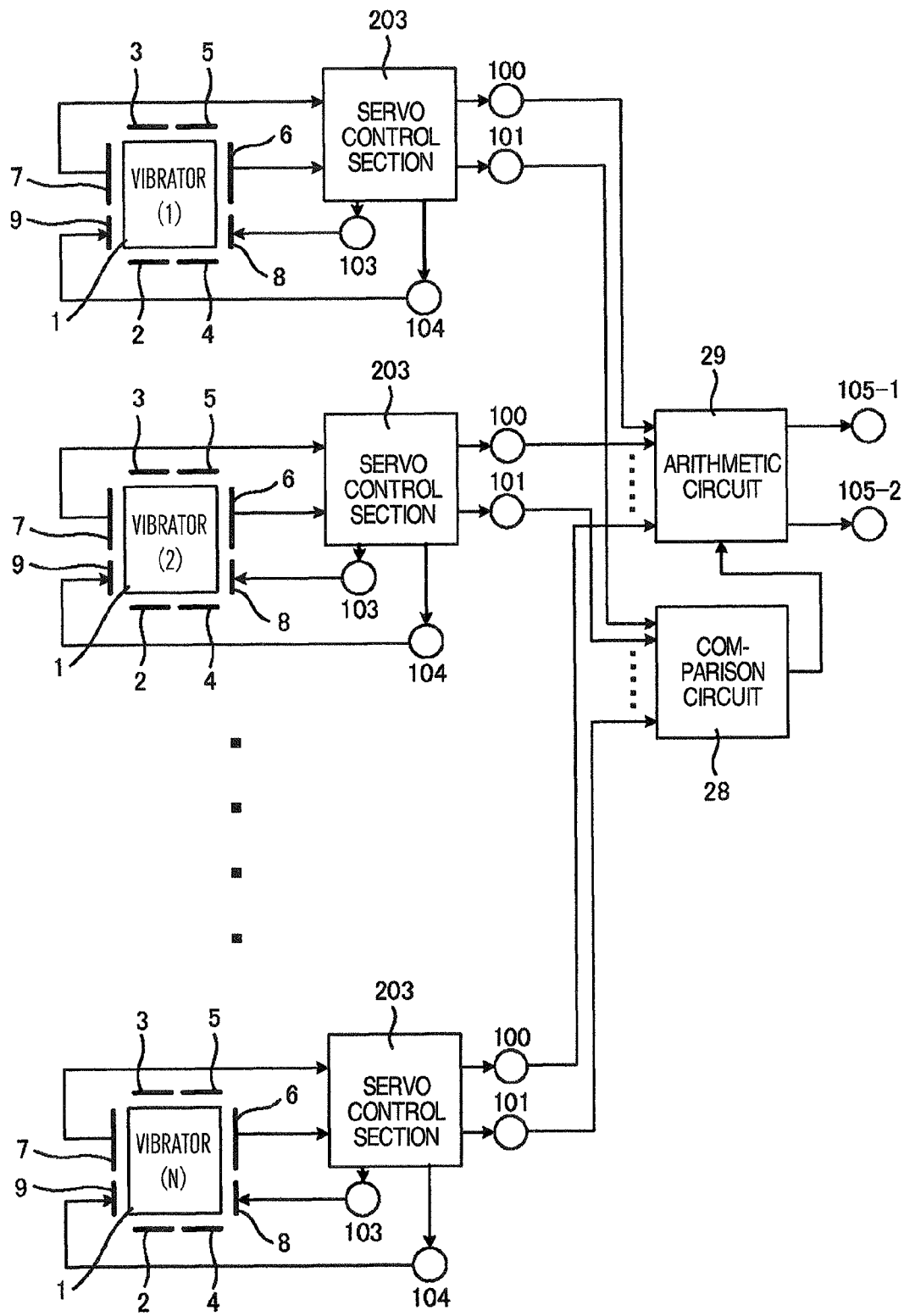
[FIG. 4] A structure of the angular velocity sensor according to a fourth embodiment.

FIG. 4 shows a structure according to the fourth embodiment of the angular velocity sensors provided by the invention.

This embodiment is configured by disposing the servo control sections 203 instead of the servo control sections 202 of the third embodiment described in FIG. 3.

The operations of the servo control sections 203 of this embodiment have been described in the second embodiment and therefore their description is omitted. The operations of the angular velocity sensors of this embodiment have been described in the third embodiment and therefore their description is omitted.

This embodiment also has the same advantages as the second embodiment, but more stable angular velocity information can be obtained by performing the averaging calculation by the arithmetic circuit 29 on the output voltages according to the Coriolis components of the angular velocity sensors 1 to N not determined as a failure based on the failure determination signal outputted by the comparison circuit 28. And, the angular velocity sensors of this embodiment are configured by having the angular velocity sensor of the first embodiment in plural, so that even if abnormality is generated in any one of the angular velocity sensors, it is possible to obtain continuously normal angular velocity information by the other angular velocity sensors. And, the number of the angular velocity sensors regarded as the failure based on the output of the comparison circuit 28 is recognized by the arithmetic circuit 29, and if the number of the angular velocity sensors recognized as a failure exceeds a predetermined number, a warning signal is outputted, so that it is possible to monitor the operation condition of the angular velocity sensors of this embodiment.

The angular velocity sensor of a fifth embodiment of the invention is described below with reference to FIG. 5.

Figure 5:
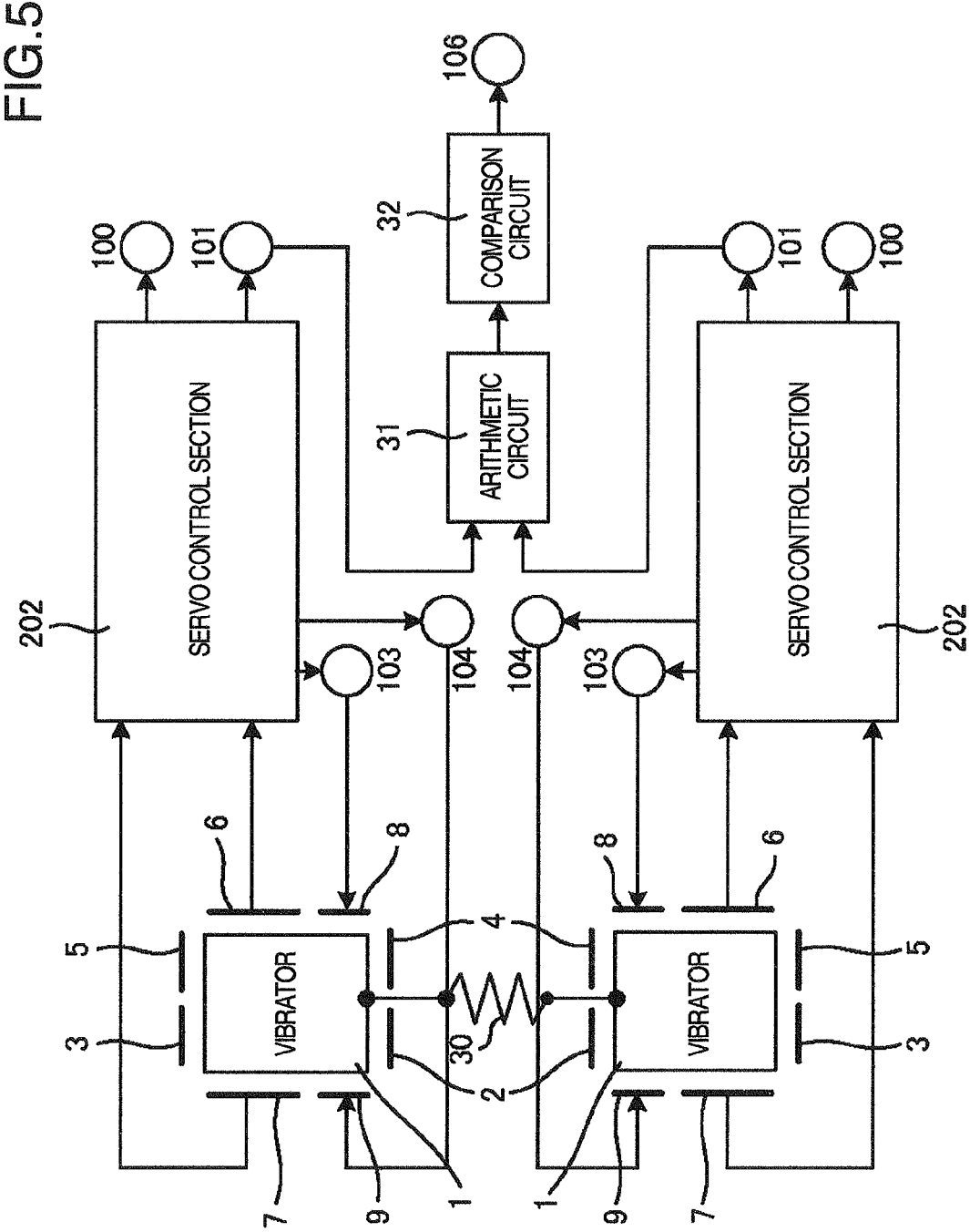
[FIG. 5] A structure of the angular velocity sensor according to a fifth embodiment.

FIG. 5 shows a structure according to the fifth embodiment of the angular velocity sensor provided by the invention.

This embodiment is configured by having the angular velocity sensor according to the first embodiment shown in FIG. 1 with the comparison circuit 19 removed, arranging a pair of the angular velocity sensors having the same characteristics in parallel, arranging the electrodes 2 to 9 such that a pair of vibrators 1 perform differential vibration mutually, disposing an elastic coupling portion 30 which elastically couples the pair of vibrators 1 to compensate a shifted phase of the differential vibration between the vibrators, and disposing an arithmetic circuit 31 and a comparison circuit 32.

In the angular velocity sensors of this embodiment, the output voltages according to the self-vibration components outputted to the output terminals 101 of the pair of angular velocity sensors are inputted to the arithmetic circuit 31. Then, the arithmetic circuit 31 subtracts the pair of signals inputted and outputs to the comparison circuit 32. Then, the comparison circuit 32 compares the previously set boundary value with the inputted and subtracted signal to determine a failure of the angular velocity sensors and outputs the failure determination signal to the output terminal 106.

Here, the self-vibration components detected by the individual angular velocity sensors are outputted to the output terminals 101 ideally as the same output voltage value because the law of conservation of momentum is kept by the elastic coupling portion 30. Therefore, the voltage value two times larger than the voltage outputted to the output terminal 101 is outputted to the output of the arithmetic circuit 31, so that a value of a predetermined range having the voltage value two times larger than the voltage value outputted to the output terminal 101 at the center is determined for the boundary value to be set in the comparison circuit 32. But, if there is a support portion or the like which gives an external force of the vibrator 1 in the detection axis direction according to a displacement amount due to the self-vibration of the vibrator 1, the law of conservation of momentum does not hold, so that a voltage value two times larger than the voltage value to be outputted to the output terminals 101 cannot be set at the center of the boundary value set in the comparison circuit 32.

The arithmetic circuit 31 is described in this embodiment as a circuit to perform subtraction processing but may also be determined to perform addition processing. When the law of conservation of momentum holds between the pair of vibrators 1 and they mutually perform differential vibration with the same self-vibration amplitude, the output after the addition becomes zero ideally. It also becomes possible to detect a failure of the angular velocity sensors by monitoring the output.

This embodiment also has the same advantages as the first embodiment, but the failure detection can be performed with more excellent accuracy than the angular velocity sensor of the first embodiment by adding or subtracting the self-vibration components detected by the pair of angular velocity sensors and determining their outputs for a failure by the comparison circuit 32.

The angular velocity sensors of a sixth embodiment of the invention are described below with reference to FIG. 6.

Figure 6:
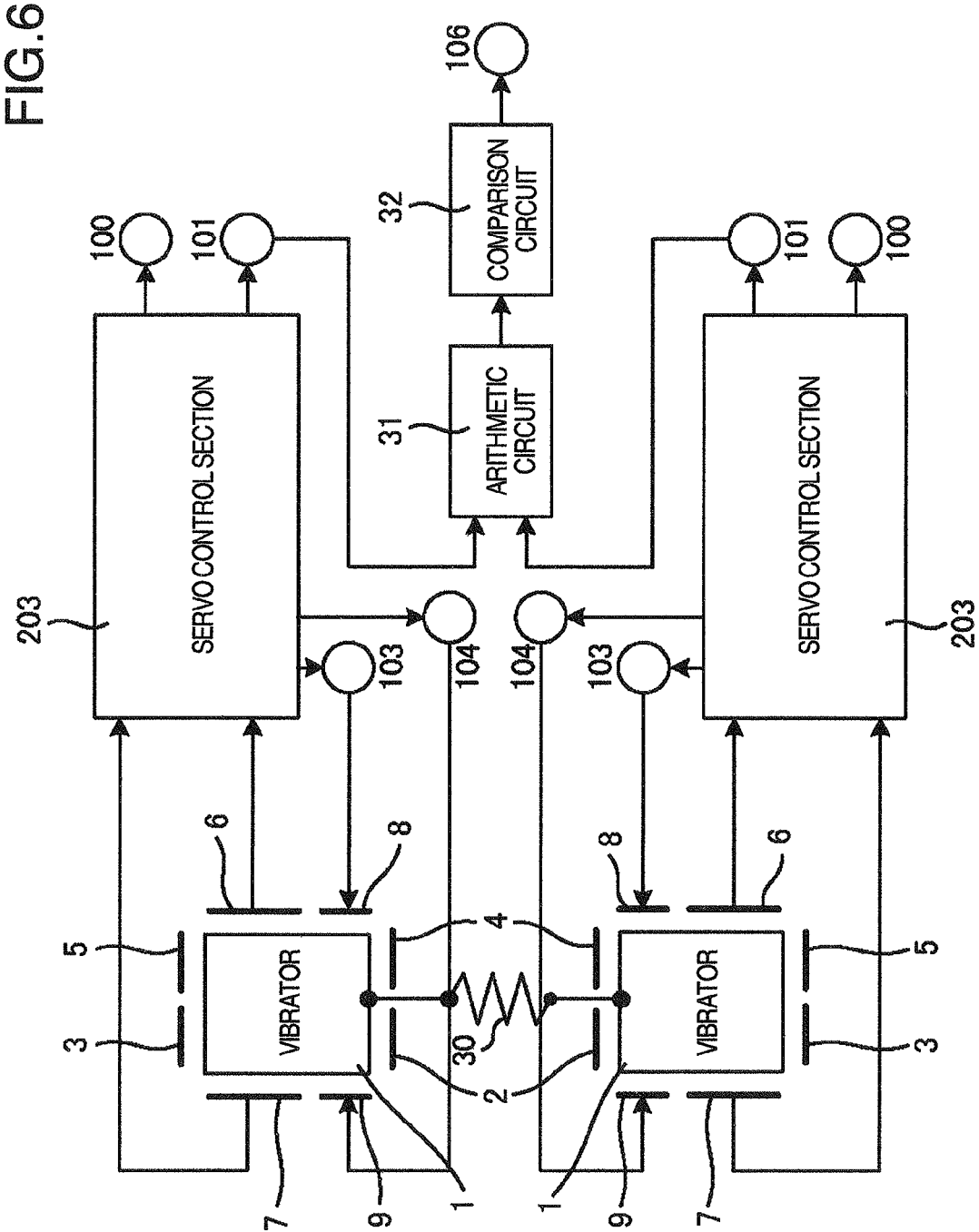
[FIG. 6] A structure of the angular velocity sensor according to a sixth embodiment.

FIG. 6 shows a structure according to the sixth embodiment of the angular velocity sensors provided by the invention.

This embodiment is configured by disposing servo control sections 203 instead of the servo control sections 202 according to the fifth embodiment described in FIG. 5.

The operations of the servo control sections 203 of this embodiment have been described in the second embodiment and therefore their description is omitted. The operations of the angular velocity sensors of this embodiment have been described in the fifth embodiment and therefore their description is omitted.

This embodiment also has the same advantages as the second embodiment, but the failure detection can be performed with more excellent accuracy than the angular velocity sensor of the second embodiment by adding or subtracting the self-vibration components detected by the pair of angular velocity sensors and determining their outputs for a failure by the comparison circuit 32.

The angular velocity sensor of a seventh embodiment of the invention is described below with reference to FIG. 7.

Figure 7:
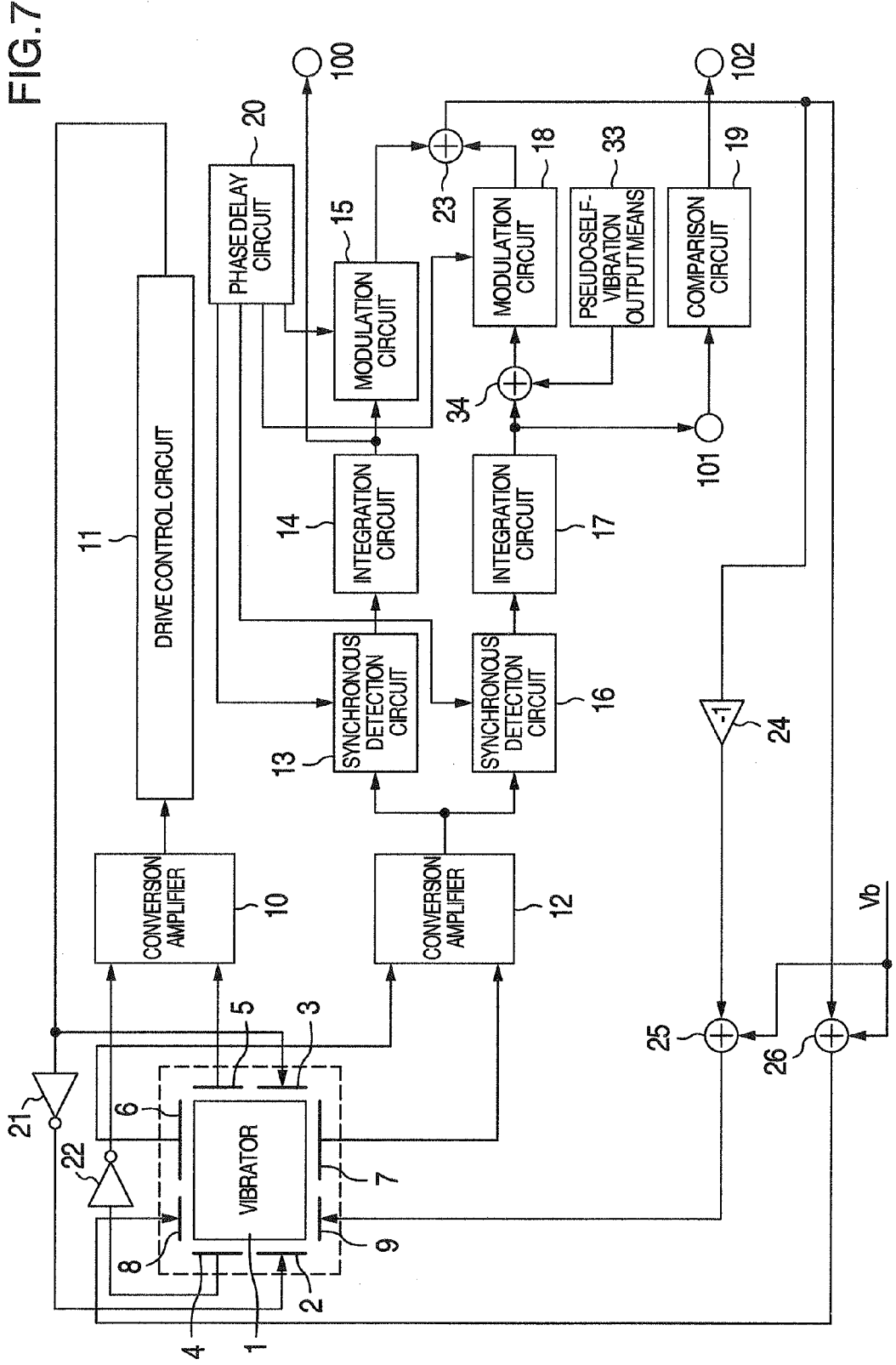
[FIG. 7] A structure of the angular velocity sensor according to a seventh embodiment.

FIG. 7 shows a structure according to the seventh embodiment of the angular velocity sensor provided by the invention.

This embodiment is configured by disposing a pseudo-self-vibration output means 33 and an adder 34, which adds the output of the pseudo-self-vibration output means 33 to the output of the integration circuit 17, for the angular velocity sensor of the first embodiment described in FIG. 1. The pseudo-self-vibration output means 33 can be configured by, for example, a method of steadily outputting a fixed value.

In the angular velocity sensor of this embodiment, the signal resulting from the addition of the output of the pseudo-self-vibration output means 33 to the output of the integration circuit 17 by the adder 34 is modulated by the $\Phi 4$ by the modulation circuit 18, added to a self-vibration feedback signal to generate an external force (hereinafter called as the pseudo-self-vibration force) which causes a pseudo-self-vibration to vibrate the vibrator 1 in the detection axis direction in the same phase as the self-vibration, and a feedback signal is generated by adding the Coriolis feedback signal outputted from the modulation circuit 15 and the self-vibration feedback signal and the pseudo-self-vibration force by the adder 23. Bias voltage Vb is then added by the adders 25 and 26 to the feedback signal and the feedback signal undergone the phase inversion by the inverter 24 and applied to the servo electrodes 8 and 9. As a result, the vibrator 1 receives the force in the detection axis direction by the voltage applied to the servo electrodes 8 and 9 to generate pseudo-self-vibration. Then, the displacement of the vibrator 1 in the detection axis direction is converted into a displacement signal by the detection electrodes 6 and 7 and the conversion amplifier 12, and the displacement signal is synchronously detected by the $\Phi 3$ by the synchronous detection circuit 16 to detect displacement of the vibrator 1 due to the self-vibration and the pseudo-self-vibration. The signal obtained by the synchronous detection circuit 16 is undergone an integration operation by the integration circuit 17. And, the output of the pseudo-self-vibration output means 33 is added to the output of the integration circuit 17 by the adder 34 and inputted again into the modulation circuit 18.

The angular velocity sensor of this embodiment performs servo control to cancel the displacement of the vibrator 1 in the detection axis direction due to the self-vibration and the pseudo-self-vibration by the above-described operation.

In the state that the servo control is being performed, the output of the integration circuit 17 is outputted to the output terminal 101 to obtain an output voltage according to the displacement due to the addition of the self-vibration component and the pseudo-self-vibration component.

The output voltage to be outputted to the output terminal 101 is in accordance with the displacement resulting from the addition of the self-vibration component and the pseudo-self-vibration component, and if the angular velocity sensor has disconnection or short-circuit or the vibrator has abnormality such as breakage, cohesion or the like, the self-vibration feedback signal given to the vibrator 1 and the displacement signal of the vibrator 1 to the resultant force of the pseudo-self-vibration force are changed, so that it is possible to detect a failure of the angular velocity sensor by monitoring the output of the integration circuit 17. Specifically, the comparison circuit 19 is previously determined to have a boundary value of the self-vibration component, the self-vibration component according to the output voltage to be outputted to the output terminal 101 is compared with the boundary value, and if it deviates from the boundary value, it is determined as a failure, and a failure detection signal is outputted to the output terminal 102.

In the angular velocity sensor of this embodiment, the output of the integration circuit 17 is monitored in the state that the output of the pseudo-self-vibration output means 33 is periodically changed, so that it can be detected whether the displacement of the vibrator 1 in the detection axis direction is made according to the change of the output of the pseudo-self-vibration output means 33, and it becomes possible to detect a failure of the angular velocity sensor.

This embodiment also has the same advantages as the first embodiment, but large vibration is not generated in the vibrator 1 by performing failure diagnosis while cancelling by the servo control the pseudo-self-vibration generated by the method described in this embodiment, so that an active diagnosis method which does not impose a burden on the vibrator 1 is enabled.

The angular velocity sensor of an eighth embodiment of the invention is described below with reference to FIG. 8.

Figure 8:
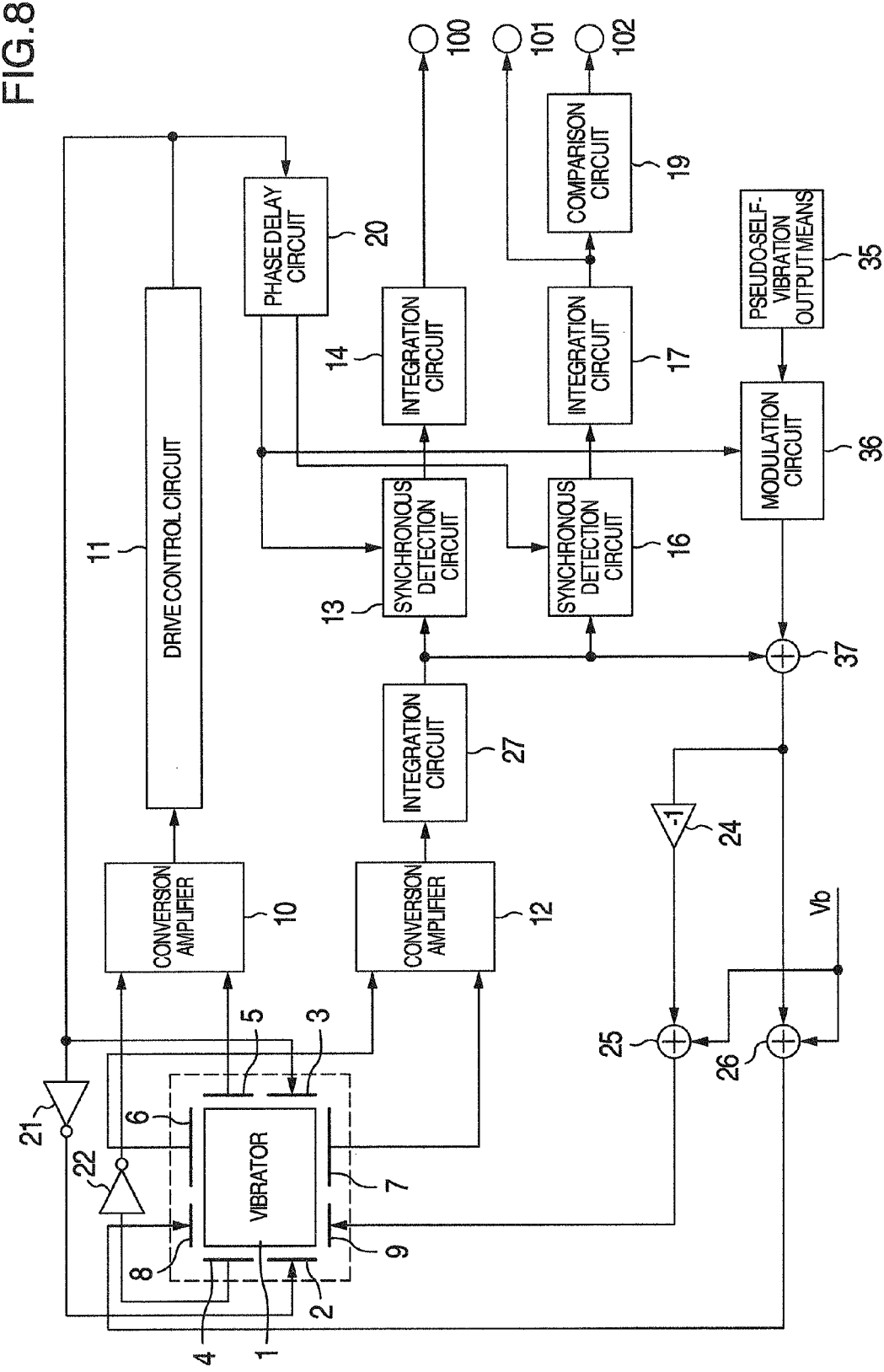
[FIG. 8] A structure of the angular velocity sensor according to an eighth embodiment.

FIG. 8 shows a structure according to the eighth embodiment of the angular velocity sensor provided by the invention.

This embodiment is configured by providing the angular velocity sensor according to the second embodiment described in FIG. 2 with a pseudo-self-vibration output means 35, a modulation circuit 36 which modulates by the $\Phi 1$, and an adder 37 which adds the modulation circuit 36 to the output of the integration circuit 27. The pseudo-self-vibration output means 35 can be configured by, for example, a method of steadily outputting a fixed value.

In the angular velocity sensor of this embodiment, the output of the pseudo-self-vibration output means 35 is modulated by the $\Phi 1$ by the modulation circuit 36 to generate a pseudo-self-vibration force, and the pseudo-self-vibration force is added to the signal outputted from the integration circuit 27 by the adder 37 to generate a feedback signal. Bias voltage Vb is then added by the adders 25 and 26 to the feedback signal and the feedback signal undergone the phase inversion by the inverter 24 and applied to the servo electrodes 8 and 9. As a result, the vibrator 1 receives the force in the detection axis direction by the voltage applied to the servo electrodes 8 and 9 to generate pseudo-self-vibration. Then, the displacement of the vibrator 1 in the detection axis direction is converted into a displacement signal by the detection electrodes 6 and 7 and the conversion amplifier 12, and the displacement signal is undergone an integration operation by the integration circuit 27, and the output of the modulation circuit 36 is added by the adder 37 to generate a feedback signal.

The angular velocity sensor of this embodiment performs the servo control to cancel the displacement of the vibrator 1 in the detection axis direction by the above-described operation.

Then, the displacement signal to be outputted by the integration circuit 27 is synchronously detected by the $\Phi 3$ by the synchronous detection circuit 16 to detect the displacement of the vibrator 1 due to the self-vibration and the pseudo-self-vibration, and the output of the synchronous detection circuit 16 is undergone an integration operation by the integration circuit 17. And, the output of the integration circuit 17 is outputted to the output terminal 101 to obtain an output voltage according to the displacement resulting from the addition of the self-vibration component and the pseudo-self-vibration component.

The output voltage to be outputted to the output terminal 101 is in accordance with the displacement resulting from the addition of the self-vibration component and the pseudo-self-vibration component, and if the angular velocity sensor has disconnection or short-circuit or the vibrator has abnormality such as breakage, cohesion or the like, the self-vibration feedback signal given to the vibrator 1 and the displacement signal of the vibrator 1 to the resultant force of the pseudo-self-vibration force are changed, so that it is possible to detect a failure of the angular velocity sensor by monitoring the output of the integration circuit 17. Specifically, the comparison circuit 19 is previously determined to have a boundary value of the self-vibration component, the self-vibration component according to the output voltage to be outputted to the output terminal 101 is compared with the boundary value, and if it deviates from the boundary value, it is determined as a failure, and a failure detection signal is outputted to the output terminal 102.

In the angular velocity sensor of this embodiment, the output of the integration circuit 17 is monitored in the state that the output of the pseudo-self-vibration output means 35 is periodically changed, so that it can be detected whether the displacement of the vibrator 1 in the detection axis direction is made according to the change of the output of the pseudo-self-vibration output means 35, and it becomes possible to detect a failure of the angular velocity sensor.

This embodiment also has the same advantages as the first embodiment, but large vibration is not generated in the vibrator 1 by performing failure diagnosis while cancelling by the servo control the pseudo-self-vibration generated by the method described in this embodiment, so that the active diagnosis method which does not impose a burden on the vibrator 1 is enabled.

The angular velocity sensor of a ninth embodiment of the invention is described below with reference to FIG. 9.

Figure 9:
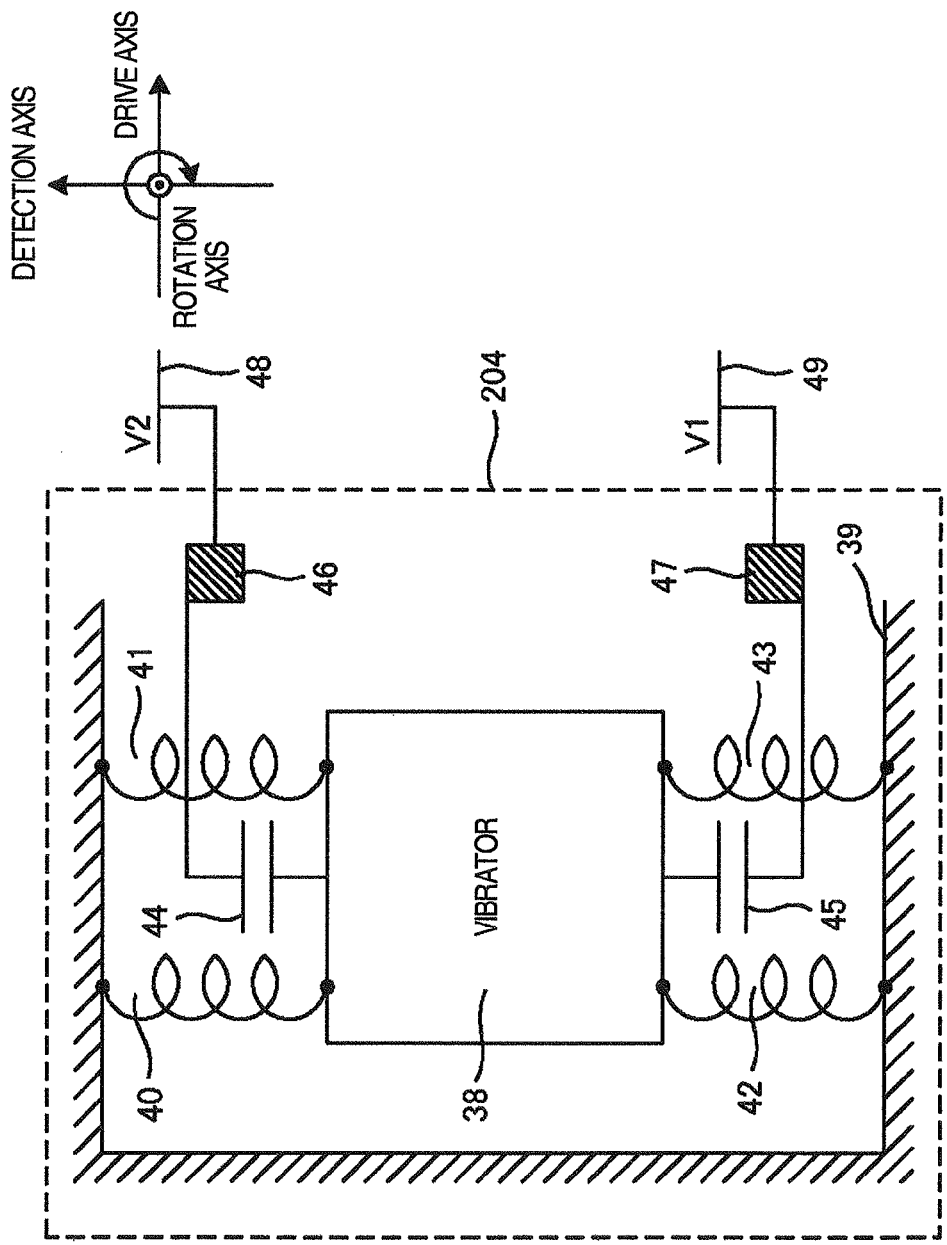
[FIG. 9] A schematic structure of a gravity center moving means in the detection axis direction of the angular velocity sensor according to a ninth embodiment.

FIG. 9 shows a structure of a gravity center moving means in the detection axis direction according to the ninth embodiment of the angular velocity sensor provided by the invention.

The gravity center moving means in the detection axis direction of the angular velocity sensor of this embodiment is comprised of a sensor element 204, which comprises a substrate 39 fixed to a vibrator 38, support portions 40, 41, 42 and 43 elastically coupling the vibrator 38 and the substrate 39, electrodes 44 and 45 for giving an electrostatic force to the vibrator 38 and fixing portions 46 and 47 for fixing the electrodes 44 and 45, and voltage applying portions 48 and 49 which apply a DC voltage to the electrodes 44 and 45.

The gravity center moving means in the detection axis direction of the angular velocity sensor of this embodiment can be realized by generating the electrostatic force by the voltage applied to the electrodes 39 and 40 by the voltage applying portions 46 and 47, and moving the gravity center of the vibrator 38 in the detection axis direction by displacing the vibrator 38 according to the electrostatic force. At this time, the vibrator 38 receives the external force according to the displacement by the substrate 39 and the support portions 40, 41, 42 and 43, so that it is necessary to apply continuously the electrostatic force to the vibrator 38 by the electrodes 44 and 45.

Here, the self-vibration is vibration which is generated by displacement on the detecting axis between the position of the center of the resultant force of the external force given to the vibrator by the driving electrodes 2 and 3 and the support portions such as the support portions 40, 41, 42 and 43 for supporting the vibrator on the substrate and the gravity center position of the vibrator 38 and which is generated by the vibration amplitude proportional to the magnitude of the displacement. Therefore, the displacement amount of the vibrator 38 due to the self-vibration can be controlled by moving the gravity center position of the vibrator 38 in the detection axis direction by the gravity center moving means in the detection axis direction described in this embodiment. This effect enables to correct variations of the self-vibration components of the individual sensor elements due to production errors. For the sensor element which is free from a production error and does not generate self-vibration, it is also possible to perform the failure detection of the angular velocity sensor by using the failure detection methods described in the first to eighth embodiments by moving the gravity center position of the vibrator by the gravity center moving means in the detection axis direction.

In this embodiment, as a realization means of the gravity center moving means in the detection axis direction, the electrodes 44 and 45 for applying the external force in the detection axis direction of the vibrator 38 are provided, but it can also be realized by applying the output voltage of the voltage applying portions 48 and 49 to the detection electrodes 6 and 7 of the sensor element 200.

The angular velocity sensor of a tenth embodiment of the invention is described below with reference to FIG. 10.

Figure 10:
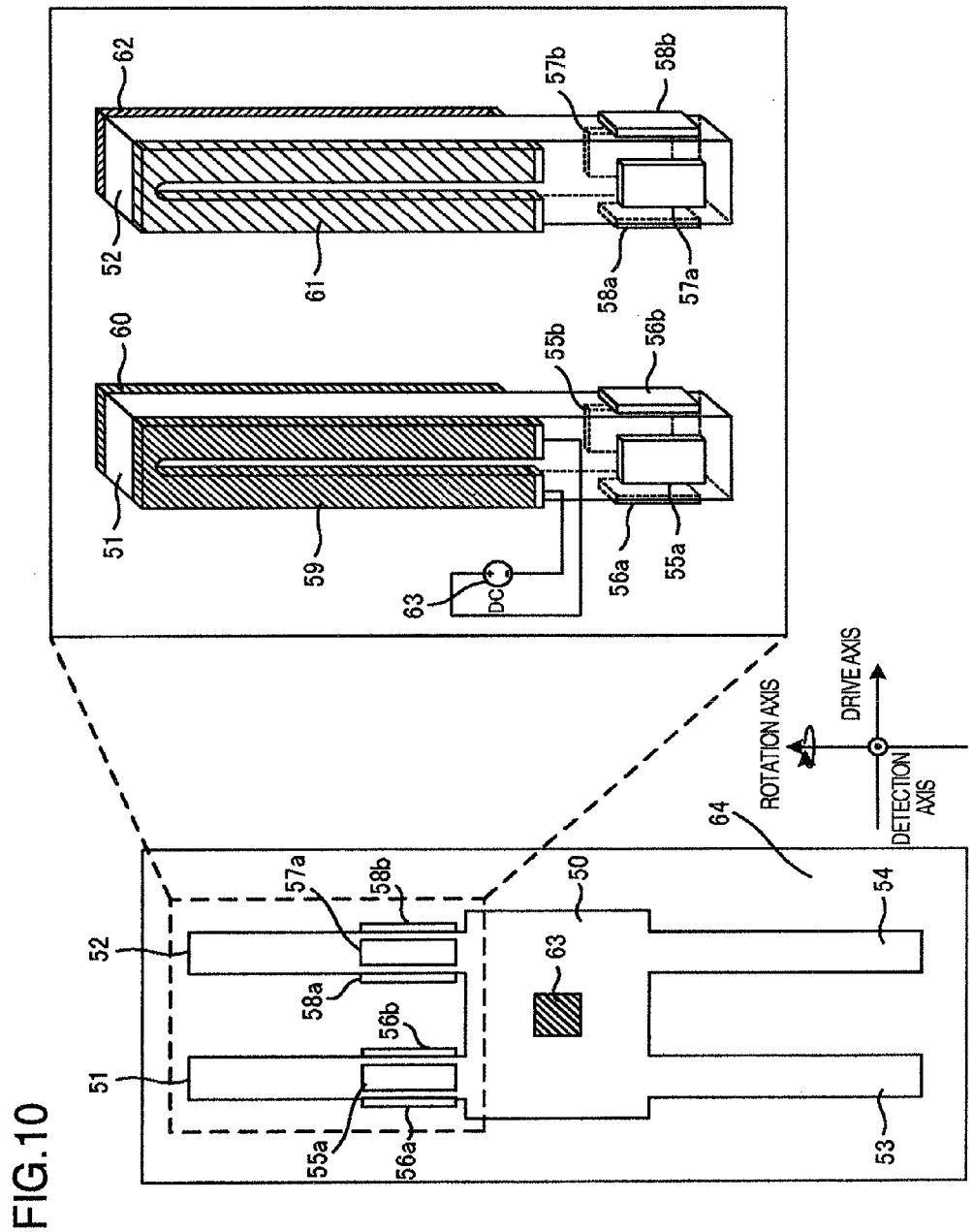
[FIG. 10] A schematic structure of a gravity center moving means in the detection axis direction of the angular velocity sensor according to a tenth embodiment.

FIG. 10 shows a structure of the gravity center moving means in the detection axis direction according to the tenth embodiment of the angular velocity sensor provided by the invention.

The gravity center moving means in the detection axis direction of the angular velocity sensor of this embodiment comprises a driving portion which is comprised of a substrate 64 fixed with a vibrator 50, a support portion 63 for coupling the vibrator 50 and the substrate 64, driving legs 51 and 52 configuring the vibrator 50, detecting legs 53 and 54, driving electrode 55a, 55b, 56a, 56b, 57a, 57b, 58a and 58b for performing drive vibration of the driving legs 51 and 52 and flat plates 59, 60, 61 and 62 made of a material having a linear expansion coefficient different from the vibrator 50 and formed with slits, and a constant-voltage generating device 63. Here, the flat plates 59, 60, 61 and 62 can be configured by, for example, forming aluminum ($23 \times 10^{-6}$/K) or copper (linear expansion coefficient $17 \times 10^{-6}$/K) on silicon (linear expansion coefficient $2.6 \times 10^{-6}$/K) configuring the driving legs 51 and 52. And, the driving electrode is comprised of the electrodes 55a, 55b, 57a and 57b for applying the output of the drive control circuit 11, and the electrodes 56a, 56b, 58a and 58b for transmitting a driving force according to the signal applied to the electrodes 55a, 55b, 57a and 57b to the driving legs 51 and 52.

The gravity center moving means in the detection axis direction of the angular velocity sensor of this embodiment can be realized by applying a voltage to the flat plates by the constant-voltage generating device 63 to give Joule heat to the driving portion, generating a predetermined warp in the driving portion by a difference of linear expansion between the flat plates and the driving legs due to the Joule heat, and moving the gravity center in the detection axis direction of the driving legs 51 and 52.

Here, the self-vibration is vibration which is generated by displacement on the detecting axis between the position of the center of the resultant force of the external force given to the vibrator by the driving electrodes 2 and 3 and the support portions such as the support portions 40, 41, 42 and 43 for supporting the vibrator on the substrate and the gravity center position of the vibrator 38 and which is generated by the vibration amplitude proportional to the magnitude of the displacement. Therefore, the displacement amount of the driving legs 51 and 52 due to the self-vibration can be controlled by moving the gravity center position of the driving legs 51 and 52 in the detection axis direction by the gravity center moving means in the detection axis direction described in this embodiment. This effect enables to correct variations of the self-vibration components of the individual sensor elements due to production errors. For the sensor element which is free from a production error and does not generate self-vibration, it is also possible to perform the failure detection of the angular velocity sensor by using the failure detection methods described in the first to eighth embodiments by moving the gravity center position of the vibrator by the gravity center moving means in the detection axis direction.

While the present invention has been described with reference to the embodiments but is not limited to them, and it will be apparent to those skilled in the art that various modifications and variations can be made within the spirit and the scope of the appended claims of the invention.

REFERENCE SIGNS LIST

1, 38, 50: Vibrator
10, 12: Conversion amplifier
11: Drive control circuit
13, 16: Synchronous detection circuit
14, 17: Integration circuit
15, 18, 36: Modulation circuit
19, 28, 32: Comparison circuit
20: Phase delay circuit

The invention claimed is:

1. An angular velocity sensor, comprising:
first and second vibrators which are elastically and displaceably supported on a substrate;
a driving means which differentially vibrates mutually the first and second vibrators in the drive axis direction horizontal to the substrate surface; and
a displacement detecting means in the detection axis direction, which detects a displacement of the first and second vibrators in the detection axis direction perpendicular to the drive axis direction, wherein the angular velocity sensor further comprises:
first and second self-vibration detecting means which detect the self-vibrations of the first and second vibrators, which are generated due to leakage in the detection axis direction of the vibrations of the first and second vibrators in the drive axis direction and are comprised of a synchronous detection circuit for synchronously detecting the output of the displacement detecting means in the detection axis direction by a signal according to the vibrations of the vibrators in the drive axis direction, and an integration circuit for integrating the output of the synchronous detection circuit;
first and second feedback circuits which completely cancel the self-vibrations of the first and second vibrators;
an arithmetic means which performs predetermined calculation according to the outputs of a pair of the integration circuits; and
an abnormality determining means which determines abnormality according to the output of the arithmetic means.

2. An angular velocity sensor, comprising:
first and second vibrators which are elastically and displaceably supported on a substrate;
a driving means which differentially vibrates mutually the first and second vibrators in the drive axis direction horizontal to the substrate surface;
a displacement detecting means in the detection axis direction which detects a displacement of the first and second vibrators in the detection axis direction perpendicular to the drive axis direction; and
first and second feedback circuits which completely cancel the displacement of the vibrators in the detection axis direction and are each comprised of an integration circuit which integrates the output of the displacement detecting means in the detection axis direction, wherein the angular velocity sensor further comprises:
first and second self-vibration detecting means which detect the self-vibrations of the first and second vibrators, which are generated due to leakage in the detection axis direction of the vibrations of the first and second vibrators in the drive axis direction and are comprised of a synchronous detection circuit for synchronously detecting the output of the displacement detecting means in the detection axis direction by a signal according to the vibrations of the vibrators in the drive axis direction, and an integration circuit for integrating the output of the synchronous detection circuit;
an arithmetic means which performs predetermined calculation according to the output of a pair of the integration circuits; and
an abnormality determining means which determines abnormality according to the output of the arithmetic means.

3. The angular velocity sensor according to claim 2, further comprising a pseudo-self-vibration applying means which applies an external force having the same phase as the self-vibration in the detection axis directions of the vibrators.

* * * * *